(12) United States Patent
Issler

(10) Patent No.: US 7,380,536 B2
(45) Date of Patent: Jun. 3, 2008

(54) COMBUSTION BOWL IN THE CROWN OF A PISTON FOR A DIESEL ENGINE

(75) Inventor: Wolfgang Issler, Schwaikheim (DE)

(73) Assignee: MAHLE GmbH, Stuttgart (DE)

( * ) Notice: Subject to any disclaimer, the term of this patent is extended or adjusted under 35 U.S.C. 154(b) by 0 days.

(21) Appl. No.: 10/587,230

(22) PCT Filed: Jan. 24, 2005

(86) PCT No.: PCT/DE2005/000089

§ 371 (c)(1),
(2), (4) Date: Sep. 5, 2006

(87) PCT Pub. No.: WO2005/071239

PCT Pub. Date: Aug. 4, 2005

(65) Prior Publication Data

US 2007/0151541 A1    Jul. 5, 2007

(30) Foreign Application Priority Data

Jan. 24, 2004    (DE) .............. 10 2004 003 658

(51) Int. Cl.
F02F 3/26 (2006.01)
F02F 3/28 (2006.01)
(52) U.S. Cl. .............. 123/276; 123/279; 123/41.35
(58) Field of Classification Search .............. 123/276, 123/279, 285, 193.4, 193.6, 41.34, 41.35
See application file for complete search history.

(56) References Cited

U.S. PATENT DOCUMENTS 3,221,722 A * 12/1965 Bachle .............. 123/41.35
5,081,968 A * 1/1992 Bruni .............. 123/193.6
5,322,042 A * 6/1994 di Priolo et al. .............. 123/263
5,979,298 A * 11/1999 Whitacre .............. 92/211
2003/0221639 A1* 12/2003 Weng et al. .............. 123/41.35
2005/0092279 A1* 5/2005 Parker et al. .............. 123/193.6
2006/0191508 A1* 8/2006 Otsuka et al. .............. 123/193.6

FOREIGN PATENT DOCUMENTS

| DE | 721 889 | 6/1942 |
| DE | 1055873 | 9/1955 |
| DE | 10 14 782 B | 8/1957 |
| DE | 100 15 709 A1 | 12/2001 |
| EP | 105 933 | 4/1984 |
| EP | 0 937 888 A | 8/1999 |
| FR | 997 692 A | 1/1952 |
| FR | 1 411 601 A | 9/1965 |
| JP | 59 145344 A | 8/1984 |

OTHER PUBLICATIONS

International Search Report.

* cited by examiner

*Primary Examiner*—Mahmoud Gimie
(74) *Attorney, Agent, or Firm*—Collard & Roe, P.C.

(57) ABSTRACT

The invention relates to a combustion recess in the head of a piston for a diesel engine, the piston being provided with a cooling duct optionally existing in the form of a cooled ring carrier. This combustion recess has, in the radially outer edge area, an undercut which is formed such that the radially outer delimitation of the combustion recess is situated sufficiently near the cooling duct so that the cooling duct has a cooling effect upon the combustion recess.

9 Claims, 5 Drawing Sheets

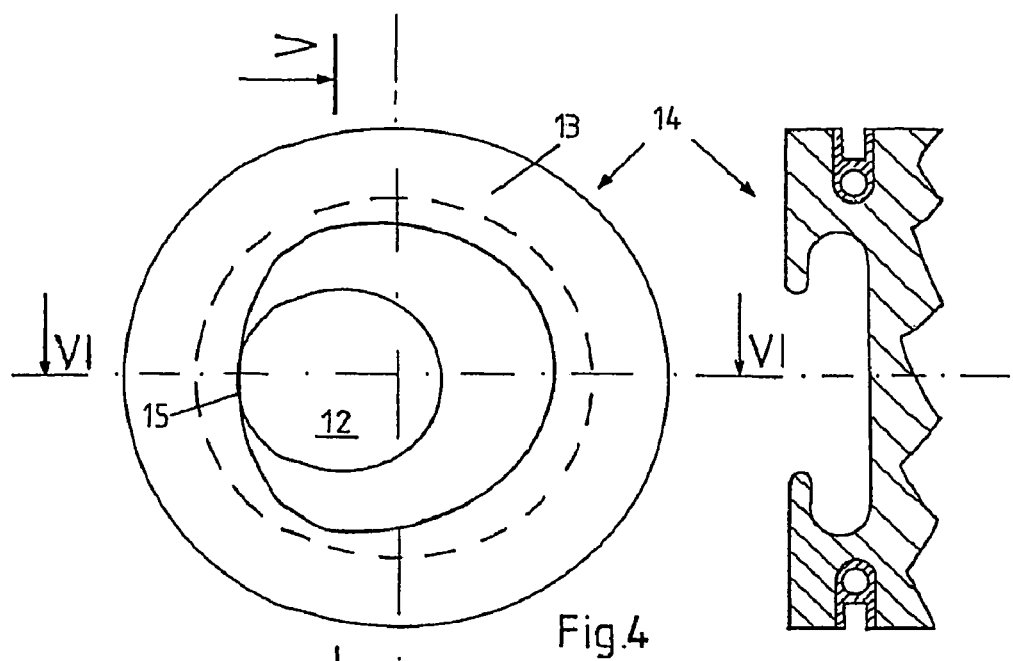
Fig.4
Fig.5
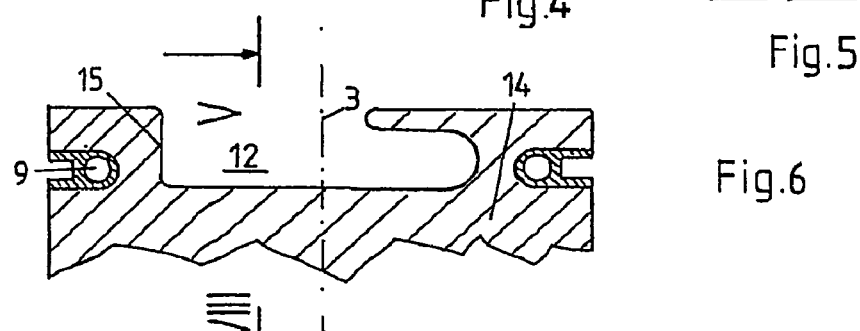
Fig.6
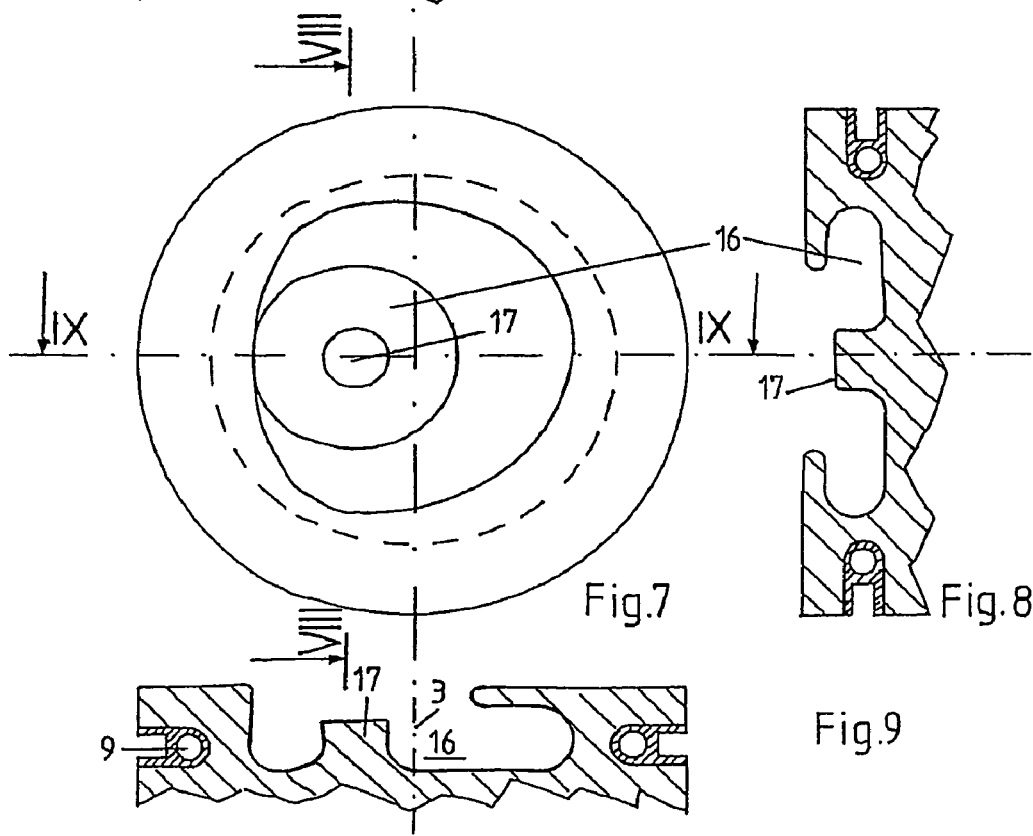
Fig.7
Fig.8
Fig.9

US 7,380,536 B2

COMBUSTION BOWL IN THE CROWN OF A PISTON FOR A DIESEL ENGINE

CROSS REFERENCE TO RELATED APPLICATIONS

Applicant claims priority under 35 U.S.C. §119 of German Application No. 10 2004 003 658.6 filed Jan. 24, 2004. Applicant also claims priority under 35 U.S.C. §365 of PCT/DE2005/000089 filed Jan. 24, 2005. The international application under PCT article 21(2) was not published in English.

BACKGROUND OF THE INVENTION

1. Field of the Invention

The invention relates to a combustion bowl in the crown of a piston for a diesel engine having a ring-shaped cooling channel disposed in the radially outer edge region of the piston on the piston crown side, whereby the combustion bowl as well as its bowl neck are disposed outside of the center relative to the longitudinal piston axis.

In a diesel engine with direct injection, combustion of the fuel/air mixture generally takes place in a combustion bowl that is formed into the crown of the piston of the diesel engine. It is known, in this connection, to provide the radially outer edge region of the combustion bowl with an undercut. A torque curve that is constant in a broad rpm range of the diesel engine in question was already mentioned as an advantage of this in the German patent document No. 721889. According to the German laying-open document 1055873, the cause of this lies in the swirling caused by the undercut, and an accompanying improvement in the evaporation of the fuel injected into the combustion bowl.

2. The Prior Art

A piston for a diesel engine is known from the European patent document EP 105 933, having a combustion bowl disposed outside of the center, into the radially outer edge region of which fuel is injected by way of several injection openings or fuel nozzle. To improve the swirling and therefore the evaporation of the fuel, the piston has a plurality of recesses uniformly distributed over the edge region.

The cited state of the art has the disadvantage that because of the combustion of the fuel/air mixture, the radially outer edge of the combustion bowl, in particular, is exposed to very great temperature stress, which can result in damage of the combustion bowl.

In the German utility model DE 80 26 159, it is suggested to provide a cooling channel between the edge of a combustion bowl disposed in the center, and the piston crown edge, in order to solve this problem. If the piston known from the prior art last mentioned is supposed to be used in a two-valve engine, in which the fuel nozzles is disposed next to the inlet and outlet valve lying symmetrical to the piston axis, i.e. outside of the center relative to the longitudinal piston axis, it is advantageous if the combustion bowl is also disposed outside of the center relative to the longitudinal piston axis, so that the fuel can be injected into the combustion bowl by the fuel nozzle, without problems.

In this connection, there is the problem that there is no room for a cooling channel between the top land of the piston and the edge region of the combustion bowl disposed outside of the center that lies closest to the top land, so that at least in this region, the cooling channel must be disposed farther away from the piston crown, in the boss region of the piston. This has the disadvantage that in this region, the edge of the combustion bowl, the bowl neck, and also the compression ring groove, which is subject to very great thermal stress, are cooled poorly and run the risk of being damaged. Another disadvantage in this connection is that the cooling channel, which furthermore lies very close to the piston crown, assumes a slanted position relative to the longitudinal piston axis, and this results in production technology problems.

Finally, the problem occurs, in this connection, that the distance between the part of the cooling channel disposed in the edge region of the piston crown and the edge region of the combustion bowl that is disposed outside of the center, which lies at a distance from the former, becomes so great that cooling of this edge region of the combustion bowl is also impaired.

SUMMARY OF THE INVENTION

It is the task of the invention to avoid the disadvantages of this state of the art. This task is accomplished with the characteristics contained in the the present invention.

BRIEF DESCRIPTION OF THE DRAWINGS

Some exemplary embodiments of the invention will be described in the following, using the drawings. These show.

DETAILED DESCRIPTION OF THE PREFERRED EMBODIMENTS

Figure 1:
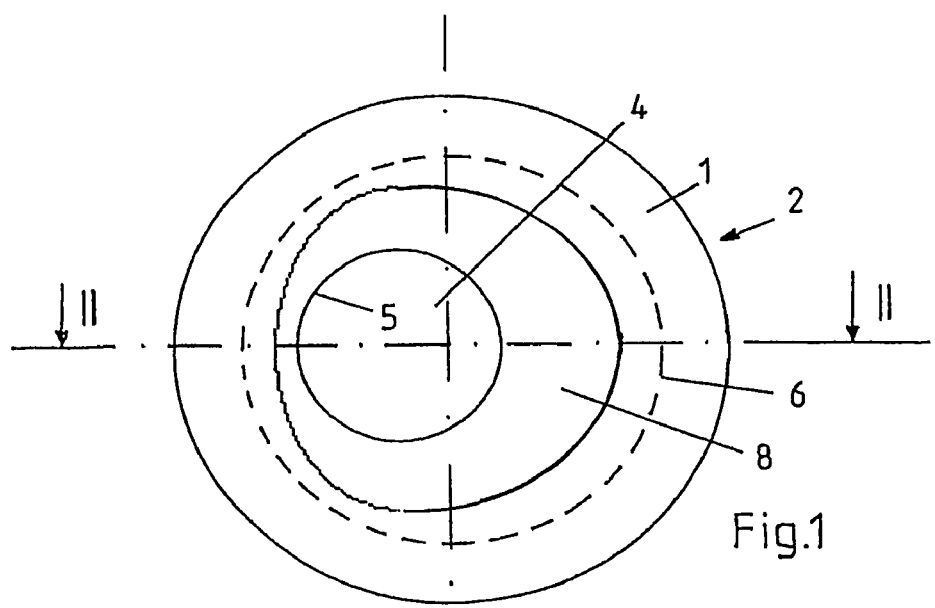
FIG. 1 a top view of a piston according to the invention, having a combustion bowl disposed outside of the center, FIG. 2 a section through the crown region of the piston according to FIG. 1, along the line II-II, FIG. 3 a top view of a piston having a combustion bowl disposed outside of the center, which has an elliptically shaped bowl neck, FIG. 4 a top view of a piston having a combustion bowl disposed outside of the center, which has no undercut on one side, FIG. 5 a section through the crown region of the piston according to FIG. 4, along the line V-V, FIG. 6 a section through the crown region of the piston according to FIG. 4, along the line VI-VI, FIG. 7 a top view of the piston according to FIG. 4, which has a hump-like molded-on part disposed in the center of the combustion bowl, FIG. 8 a section through the crown region of the piston according to FIG. 7, along the line VIII-VIII, FIG. 9 a section through the crown region of the piston according to FIG. 7, along the line IX-IX, FIG. 10 a top view of a piston having a combustion bowl disposed outside of the center, which is composed of two regions that are semi-circular in shape, and which is undercut over its entire circumference, FIG. 11 a top view of a piston having a combustion bowl disposed outside of the center, which is composed of two regions that are semi-circular in shape, and which has no undercuts on two sides that lie opposite one another, FIG. 12 to 14 top views of pistons having combustion bowls disposed outside of the center, the shapes of which are adapted to the number and the orientation of the bores of injection nozzles.
Figure 2:
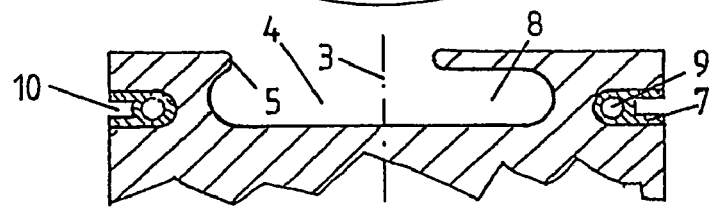

FIG. 1 shows a top view of the crown 1 of a piston 2 for a diesel engine, into which a combustion bowl 4 having a radially outer delimitation that is configured to be unround is formed, disposed outside of the center, relative to the longitudinal piston axis 3, and having a circular bowl neck 5. Although the radially outer delimitations of the combustion bowls are not visible in the top views according to the following figures, they have not been drawn with a broken line, since the core of the present invention relates, in particular, to the shape and arrangement of these bowls. However, the radially inner delimitation 6 of a cooled ring insert 7, which is shown in FIG. 2, a section through the crown region of the piston 2 according to FIG. 1, along the line II-II, is drawn with a broken line in FIG. 1. FIG. 2 also shows the cross-sectional shape of the combustion bowl 4 with the bowl neck 5 and with the undercut 8 that surrounds the entire combustion bowl 4.

In this connection, the radially outer delimitation of the undercut 8 of the combustion bowl 4 comes so close to the radially inner delimitation of the cooled ring insert 7, in all regions, that not only the groove 10 for a compression ring not shown in the figure, but also all the edge regions of the combustion bowl 4 are cooled by the cooling channel 9.

Figure 3:
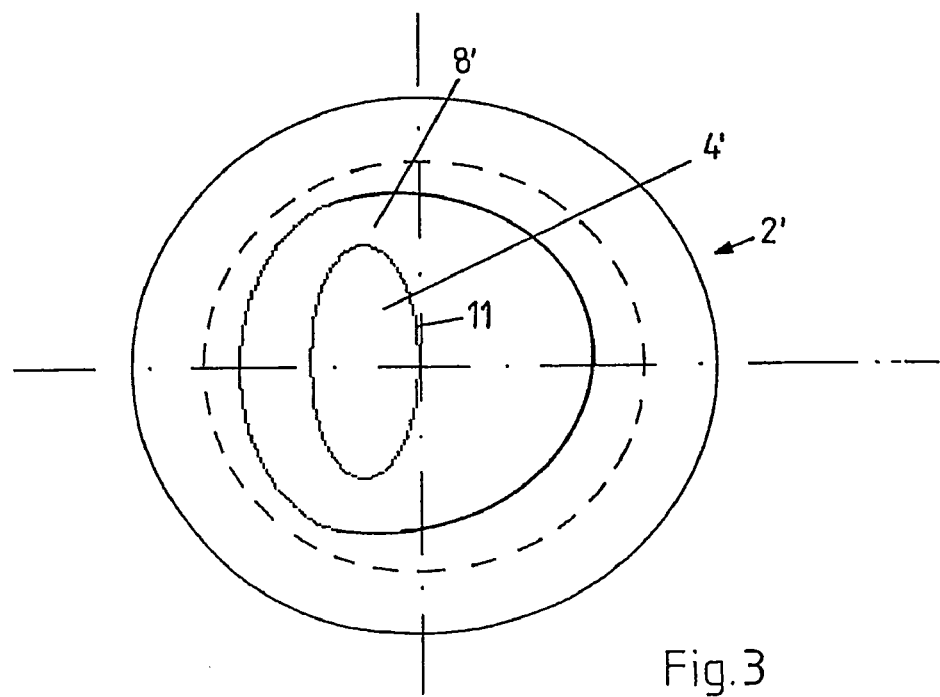

In contrast to the combustion bowl according to FIGS. 1 and 2, the bowl neck 11 shown in FIG. 3 is configured to be elliptical. The advantage of this lies in the fact that the undercut 8' that results therefrom is reduced in size close to the main axis region of the bowl neck 11, as compared with the exemplary embodiment shown in FIGS. 1 and 2.

The combustion bowl 12 shown in FIGS. 4 to 6 is disposed outside of the center relative to the longitudinal piston axis 3, in the region of the crown 13 of the piston 14, and is configured to be unround. As is shown, in particular, by the section according to FIG. 6 through the crown region of the piston 14, the combustion bowl 12 has no undercut in the region 15, which brings about the best possible lowering of the temperature in the bowl edge and the bowl neck, due to the cooling effect of the cooling channel 9.

The configuration of the combustion bowl 16 according to FIGS. 7 to 9 has a molded-on part 17 configured in hump-like manner, disposed in the center, which assures better swirling and therefore an improvement in the combustion of the fuel sprayed into the combustion bowl 16.

Figure 10:
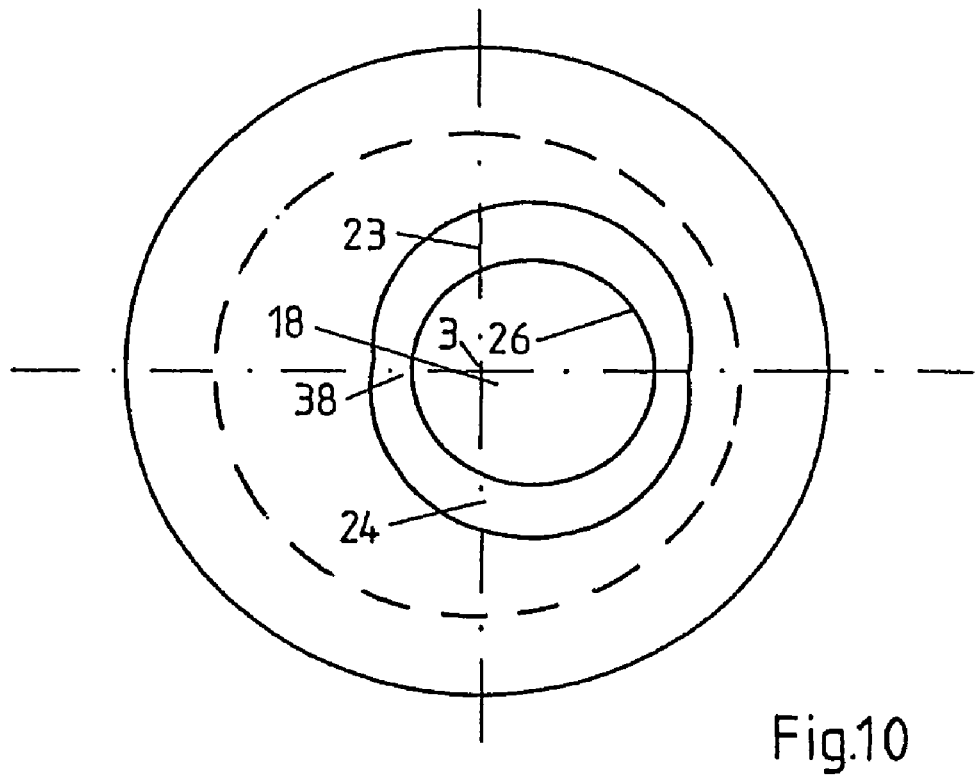

The configurations of combustion bowls 18 to 22 shown in FIGS. 10 to 14 have shapes that are adapted to the orientation and the number of bores of the injection nozzles and the width of the fuel jets sprayed into the combustion bowls 18 to 22, proceeding from the nozzles. Thus, the combustion bowl 18 according to FIG. 10 is disposed outside of the center relative to the longitudinal piston axis 3, provided with a circular bowl neck 26, and composed of two regions 23 and 24 that are arc-shaped in cross-section and lie opposite one another. It has an undercut 38 over its entire circumference.

Figure 11:
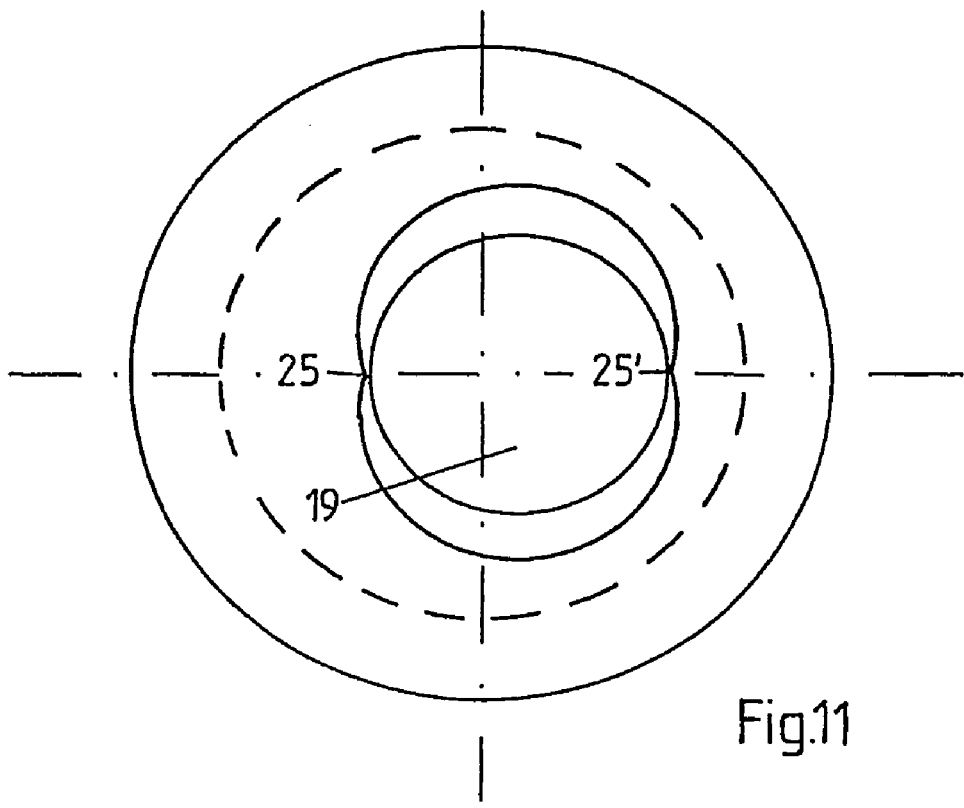

The combustion bowl 19 according to FIG. 11 differs from the combustion bowl 18 (FIG. 10) in that it has no undercut at two regions 25 and 25' that lie opposite one another.

Figure 12:
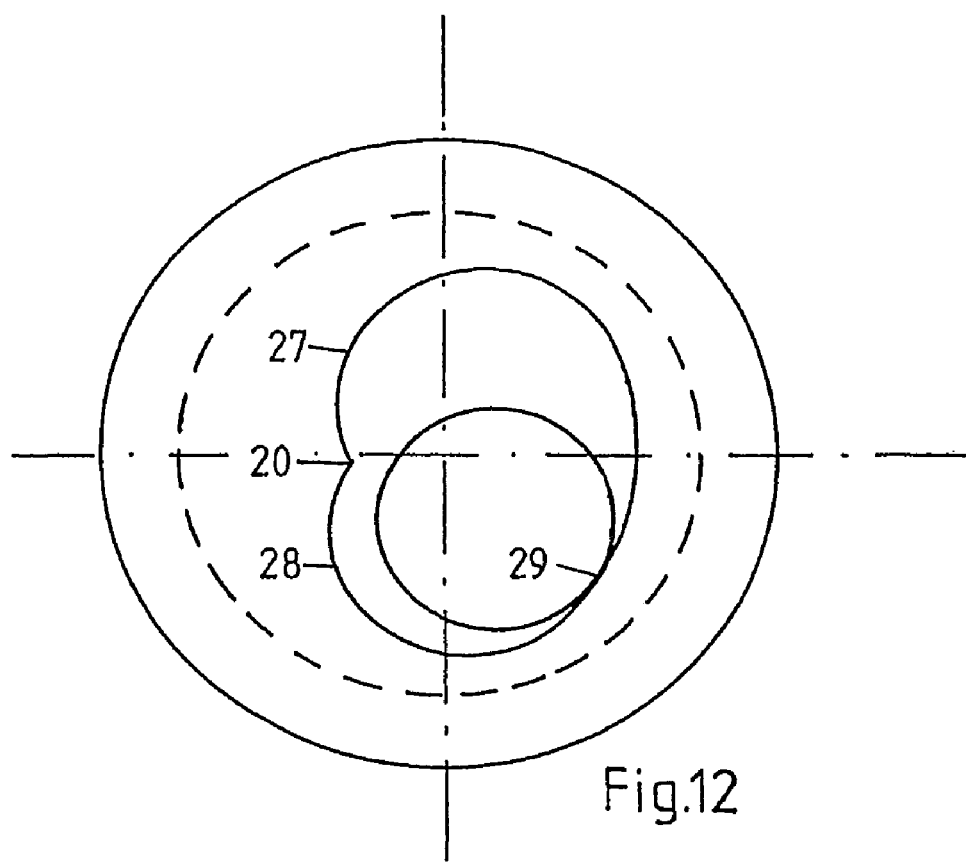

The combustion bowl 20 according to FIG. 12 differs from the combustion bowls 18 and 19 according to FIG. 10 and 11 in that the bowl neck is not disposed symmetrical to the combustion bowl 20 and has no undercut in the region 29. It is essentially composed of two circle segments 27 and 28.

Figure 13:
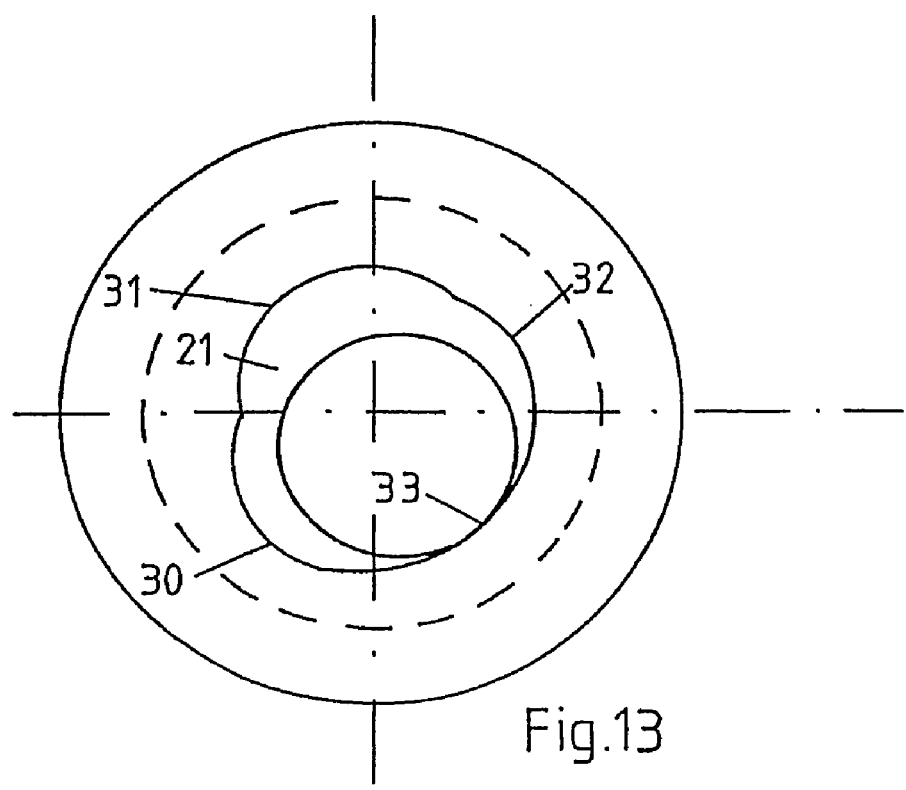
Figure 14:
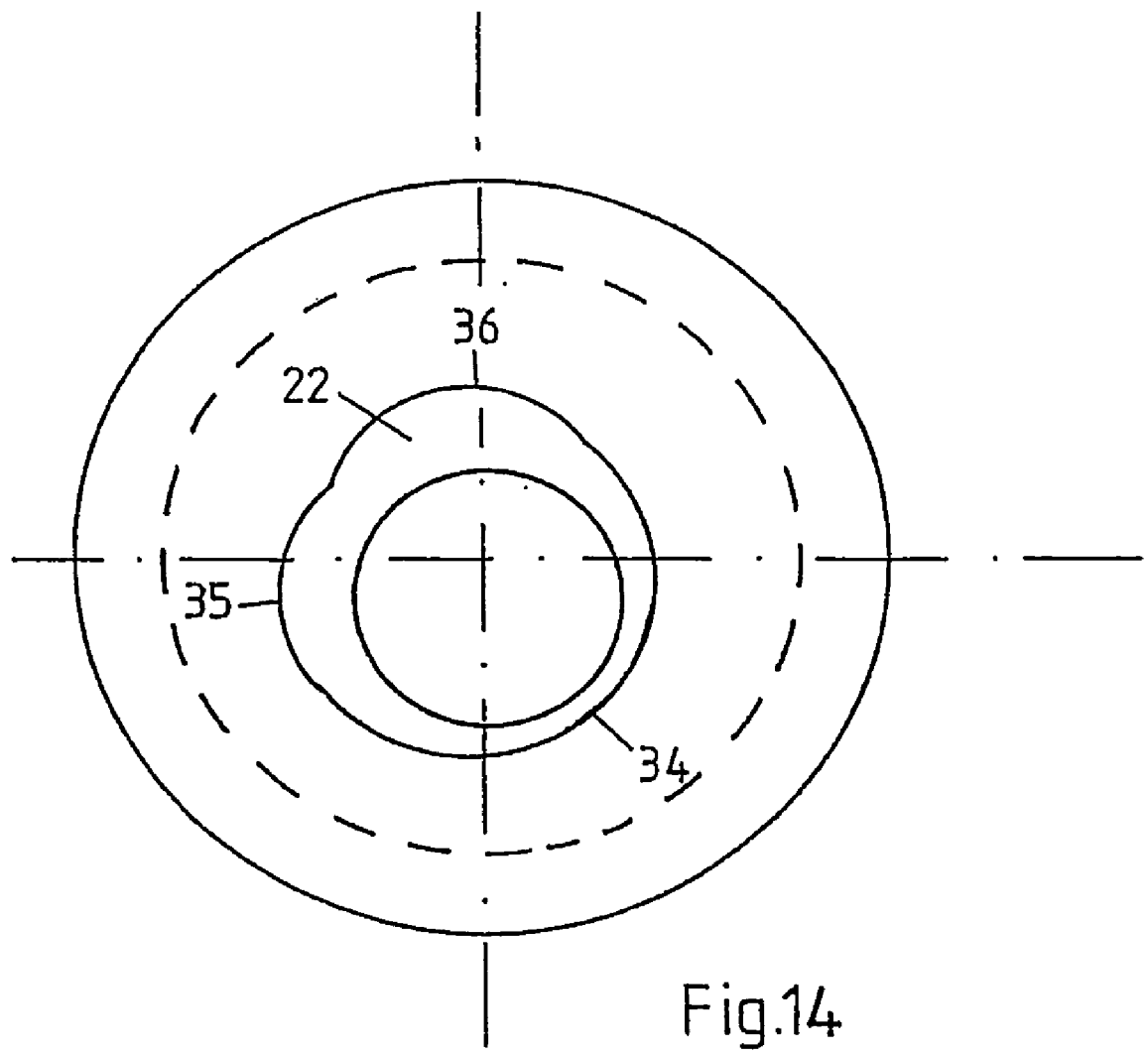

The combustion bowls 21 and 22 according to FIGS. 13 and 14 consist of three circle segments, in each instance. However, it is also possible to compose the combustion bowls of more than three circle segments. In this connection, the size and arrangement of each circle segment can correspond to the direction and the width of the fuel jet introduced into the circle segment in question, whereby injection nozzles having bores of different diameters are used.

The combustion bowl 21 according to FIG. 13 is formed from the three circle segments 30, 31, and 32, and a region 33 without undercut.

The combustion bowl 22 shown in FIG. 14 consists of three circle segments 34, 35, 36 having different diameters, and of a circumferential undercut having a cross-section that varies over the circumference.

Other embodiments of combustion bowls, not shown in the figures, are characterized in that in this connection, not only the radially outer delimitations of the combustion bowls but also their bowl necks are configured to be unround. If it is taken into consideration in this connection that the production of the combustion bowls takes place in two or more machining steps with axis-symmetrical machining, in each instance, whereby the piston is displaced in the corresponding direction between the machining phases, it becomes clear that in this way, the possibility exists to give the combustion bowls essentially the shape of a triangle, a rectangle, or a polygon, with the exception of partially circle-shaped corner regions.

REFERENCE SYMBOL LIST 1 crown of the piston 2
2, 2' piston
3 longitudinal piston axis
4, 4' combustion bowl
5 bowl neck
6 radially inner delimitation of the cooled ring insert 7
7 cooled ring insert
8, 8' undercut
9 cooling channel
10 groove for a compression ring
11 elliptical bowl neck
12 combustion bowl
13 crown of the piston 14
14 piston
15 region of the combustion bowl 12
16 combustion bowl
17 molded-on part
18, 19, 20, 21, 22 combustion bowl
23, 24 region of the combustion bowl 18
25, 25' region of the combustion bowl 19
26 bowl neck
27, 28 circle segment
29 region of the combustion bowl 20
30, 31, 32 circle segment
33 region of the combustion bowl 21
34, 35, 36 circle segment
38 undercut

The invention claimed is:

1. Combustion bowl (4, 4', 12, 16, 18-22) in the crown (1, 13) of a piston (2, 2', 14) for a diesel engine,
having a ring-shaped cooling channel (9) disposed in the radially outer edge region of the piston (2, 2', 14) on the piston crown side,
whereby the combustion bowl (4, 12, 16, 18-22) as well as its bowl neck (5, 11, 26) are disposed outside of the center relative to the longitudinal piston axis (3),
wherein
an undercut (8, 8', 38), which extends radially outward and non-uniformly relative to the bowl neck (5, 11, 26) toward the cooling channel (9), is formed into at least a part of the radially outer edge region of the combustion bowl (4, 12, 16, 18-22), to such an extent that the entire radially outer edge region of the combustion bowl (4, 12, 16, 18-22) is disposed sufficiently close to the cooling channel (9) for a cooling effect of the cooling channel (9) on the combustion bowl (4, 12, 16, 18-22).

2. Combustion bowl (4, 12, 16, 18-22) according to claim 1, comprising a circle-shaped bowl neck (5, 26).

3. Combustion bowl (4') according to claim 1, comprising an ovally shaped bowl neck (11).

4. Combustion bowl according to claim 1, wherein a molded-on part (17) configured in hump-like manner is disposed in the center of the crown of the combustion bowl (16).

5. Combustion bowl (12, 16, 20, 21, 22) according to claim 1, comprising at least one radially outer edge region with undercut and at least one radially outer edge region (15, 25, 25', 29, 33) without undercut.

6. Combustion bowl (18 to 20) according to claim 1, comprising two regions (23, 24, 27, 28) shaped essentially like a circle segment, which lie opposite one another.

7. Combustion bowl (21, 22) according to claim 1, comprising more than two regions (30-32, 34-36) shaped like a circle segment.

8. Combustion bowl (18-22) according to claim 6, wherein the regions (23, 24, 27, 28, 30-32, 34-36) shaped like a circle segment are machined with a transition into one another.

9. Combustion bowl (4, 12, 16, 18-22) according to claim 1, wherein fuel is injected into the combustion bowl (4, 12, 16, 18-22) by way of injection nozzles, the bores of which are dimensioned and disposed in such a manner that the width and the orientation of the fuel jets are adapted to the local expanses of the related bowl regions.

\* \* \* \* \*